Jan. 10, 1928.
J. D. BEACH
SAFETY VALVE
Filed July 23, 1926
1,655,889
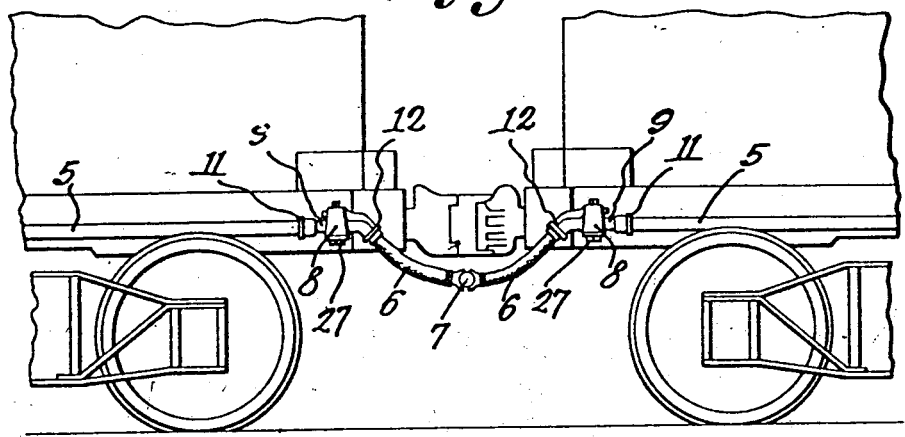
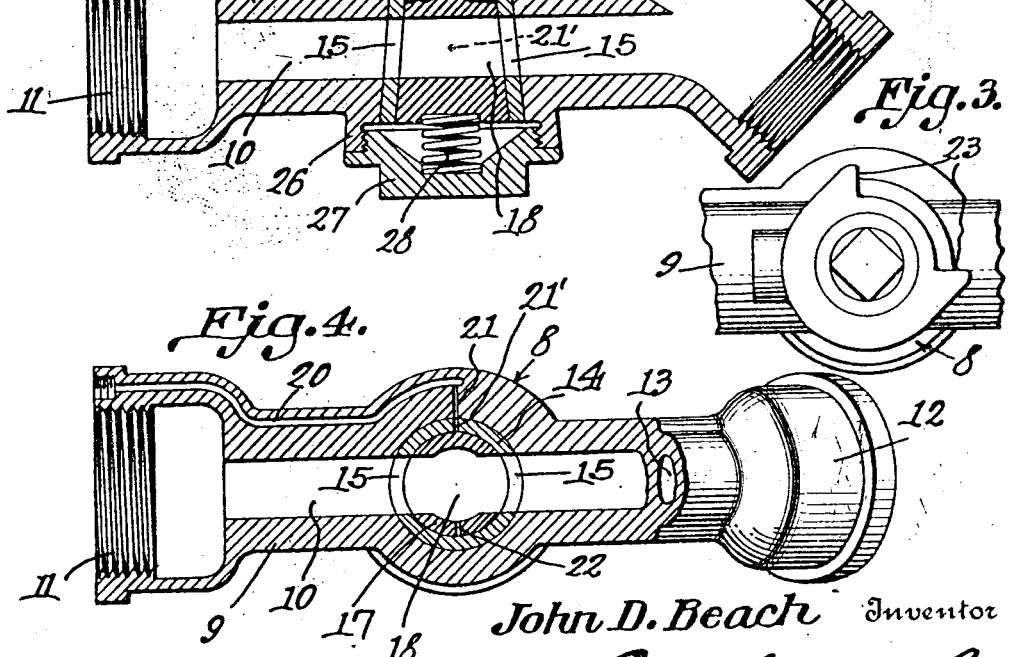
John D. Beach, Inventor
By C. A. Snow & Co.
Attorneys Patented Jan. 10, 1928.

1,655,889

UNITED STATES PATENT OFFICE.

JOHN D. BEACH, OF RICHMOND, VIRGINIA.

SAFETY VALVE.

Application filed July 23, 1926. Serial No. 124,468.

This invention relates to valve constructions and more particularly to safety valve construction especially designed for use in connection with the steam pipe line of a railway train.

The primary object of the invention is to provide means for exhausting steam from the flexible pipe or hose employed in connecting the ends of adjacent steam pipes of cars of a train, thereby eliminating any possibility of the steam burning the person uncoupling the flexible pipes between adjacent cars.

A still further object of the invention is to provide means for exhausting the condensation from the valve to insure against the valve freezing to prevent the operation thereof.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a fragmental elevational view illustrating steam pipes as supplied with safety valves constructed in accordance with the invention.

Figure 2 is a longitudinal sectional view through the valve.

Figure 3 is a plan view of the valve.

Figure 4 is a sectional view taken at right angles to Figure 2.

Referring to the drawing in detail, the reference character 5 indicates a steam pipe of a railway car, and as shown by Figure 1 of the drawing, two of these steam pipes are connected by the usual flexible pipes or hose 6.

These pipes 6 have their free ends connected by means of the usual coupling 7, the passage of steam through the pipes 6 being controlled by means of the valves 8 that form the essence of the present invention.

Each valve 8 includes a body portion 9 formed with a bore 10 extending therethrough, the bore having a threaded extremity 11 to be secured to the steam pipe with which the valve is used, while the opposite end of the valve body extends downwardly as at 12, where it has connection with the flexible pipe 6.

As illustrated by Figure 2, the upper side of the body portion is formed with a bore or passageway 13 through which steam is adapted to exhaust to relieve the steam pressure within the pipes 6, when the valves 8 have been operated to cut off the main steam supply.

The valve body is formed with a tapered opening adapted to accommodate the valve lining 14 formed with aligning openings 15 and aligning openings 16, the openings 16 being provided to establish communication between the interior of the valve and the passageway 13, while the openings 15 establish communication between the interior of the valve and the bore 10.

Operating within the valve lining 14 is a plug 17 which is formed with an opening 18 adapted to align with the openings 15 and bore 10, while the opposite end of the plug is provided with an opening 19 extended at right angles to the opening 18 and which communicates with the passageway 13 when the plug has been rotated to move the opening 18 out of alignment with the bore 10.

A drain passageway 20 is formed in the valve body and communicates with the vent 21 of the valve body and with vent 21' of the valve lining 14. When the valve is closed an opening 22 in the valve plug will be brought into communication with the pressure side of the bore 10 and, at the time the opening 18 will be brought into communication with the vent 21'. Thus condensed moisture in the pressure side of the valve will be free to drain through opening 22 into the opening 18 in the valve plug 17 and thence through one of the openings 15 to the vents 21' and 21 and passage 20. The outer end of the passageway 20 is threaded to receive a plug, should it be desired to close the passageway 20.

Shoulders indicated at 23 are formed exteriorly of the valve and are adapted to cooperate with a finger of an operating key not shown, to indicate to the operator when the valve has been moved to certain positions.

Extending downwardly from the body portion is a threaded flange 26 adapted to accommodate the threads of the plug 27 that is formed with a seat to accommodate one end of the coiled spring 28, which coiled spring has its opposite end seated in a recess of the plug 17 to cause the plug to be securely held within the lining 14.

From the foregoing it will be obvious that due to this construction, the valve may be turned to cut off communication between the pipes 5 and 6, and that the steam trapped in the pipe sections 6 may exhaust through the passageway 13 and opening 19 which is moved to register with the passageway 13 when the valve is moved to cut off the supply of steam in the pipes 5.

When the pipe sections 6 are uncoupled, all danger of the operator becoming burned or injured by the steam exhausting from the pipes 6, when their ends are disconnected, is eliminated.

I claim:—

A pipe line valve for railway trains including a body portion having a lateral passageway and a main passageway communicating with the lateral passageway to exhaust fluid into the lateral passageway, said valve body having a lateral bore adjacent to the main passageway and defining a vent opening, a valve operating in the valve body, said valve having an opening adjacent to its upper end and an opening adjacent to its lower end disposed at right angles to each other, the opening at the upper end adapted to permit fluid to pass through the lateral passageway when the main passageway is closed, said opening at the lower end of the valve adapted to permit fluid to pass through the lower passageway when the upper passageway is closed, and said valve having an opening independent of the aforesaid openings and designed to establish communication between one end of the valve and said vent opening through the opening adjacent to the lower end of the valve when the valve is moved to close the main passageway.

In testimony that I claim the foregoing as my own, I have hereto affixed my signature.

JOHN D. BEACH.